Oct. 13, 1936.   P. SCHUFTAN ET AL   2,057,598
PROCESS OF SEPARATING A LIQUID INTO ITS CONSTITUENT PARTS
Filed Oct. 23, 1934   3 Sheets-Sheet 1

Oct. 13, 1936.   P. SCHUFTAN ET AL   2,057,598
PROCESS OF SEPARATING A LIQUID INTO ITS CONSTITUENT PARTS
Filed Oct. 23, 1934   3 Sheets-Sheet 2
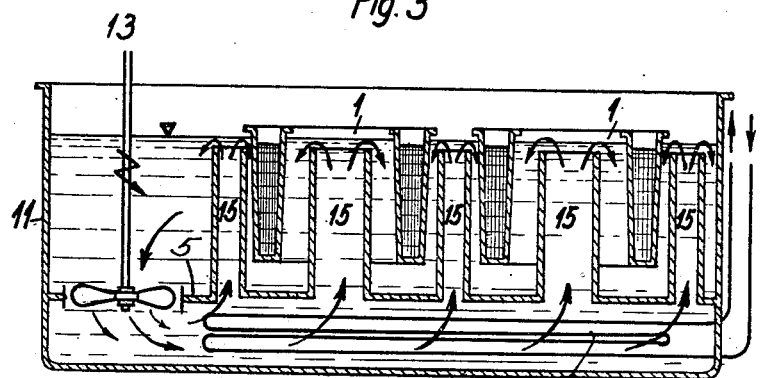
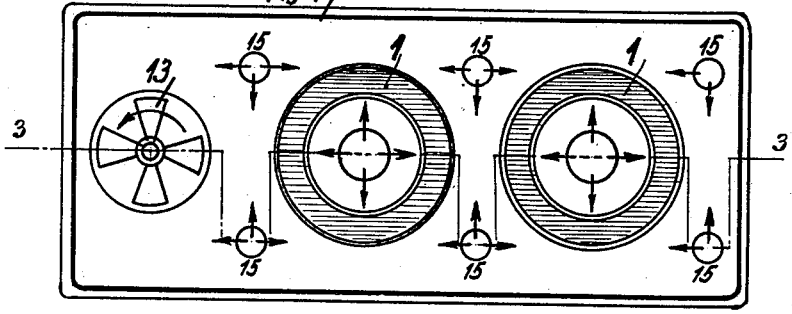
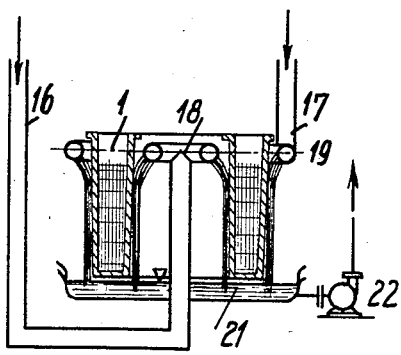
Inventors:
Paul Schuftan,
Ernst Karwat,
Albrecht Steinbach,
By Potter, Pierce & Scheffler,
Attorneys

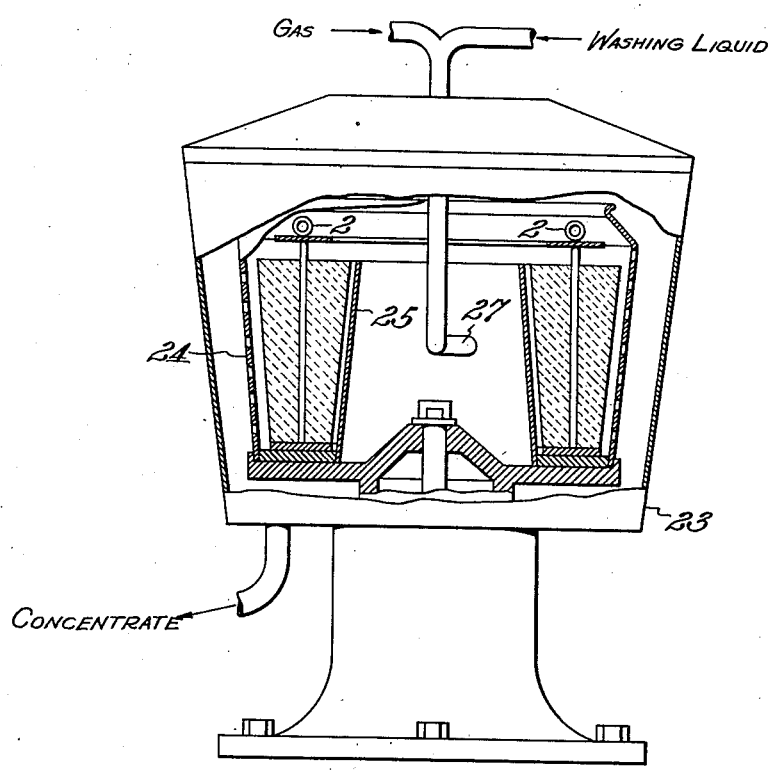

Patented Oct. 13, 1936

2,057,598

UNITED STATES PATENT OFFICE 2,057,598

PROCESS OF SEPARATING A LIQUID INTO ITS CONSTITUENT PARTS

Paul Schuftan, Hollriegelskreuth, near Munich, Ernst Karwat, Grosshesselohe, near Munich, and Albrecht Steinbach, Wiesbaden, Germany Application October 23, 1934, Serial No. 749,666
In Germany November 1, 1933

12 Claims. (Cl. 62—124)

This invention relates to a process for resolving solutions and liquid mixtures into their constituents by crysallizing and separating individual constituents thereof.

It is known to separate and recover constituents of solutions by converting either the solute or the solvent into the solid condition and then separating the solid and liquid phases. In this manner salts can be deposited from solutions, and concentrates can be produced from liquids (such as milk) by freezing out the contained water. For the latter purpose in particular, it has been proposed either to transform the liquid into a more or less compact pulp of ice crystals by cooling accompanied by agitation, or to freeze the liquid into blocks and then crush the blocks and then separate the ice from the mother liquor, for example by centrifuging.

The present invention contemplates a process for resolving solutions into their constituents which is substantially simpler in operation than the processes hitherto suggested. To this end, according to the invention, the liquid to be resolved is cooled in a vessel of a shape adapted to that of the apparatus employed for separating the solid and liquid phases, the cooling being carried to such an extent that a structurally stable body that is to say, a solid body which retains its shape, is obtained which can be directly inserted into the separator and further treated therein.

The temperature gradient during the cooling process should be greatest in the direction in which the forces act during the subsequent separation of the crystals and concentrate. Experiments have shown that, in such case, the orientation of the crystals formed coincides with the direction of the action of force during the separation, so that a particularly easy and effective separation of the liquid and solid phases results. The lowest temperature attained in cooling must be above the eutectic temperature of the constituents to be separated, since otherwise, complete separation of the constituents is fundamentally impossible. Nevertheless, in certain circumstances, for example when a high rate of cooling is desired, a partial descent below the eutectic temperature is permissible, if the moulded body be correspondingly warmed prior to the separation of the two phases.

The process of the present invention will hereinafter be more fully described as applied to the production of a milk concentrate by freezing out the water and then separating the concentrate from the ice, and with reference to the accompanying drawings which illustrate diagrammatically and by way of example various embodiments of apparatus suitable for carrying the present invention into practical effect, and in which:—

Fig. 3 is a longitudinal section through a refrigerating apparatus embodying a plurality of refrigeration cells on the line 3—3 of Fig. 4;

Fig. 4 is a top plan view of Fig. 3;

Fig. 5 is a section through a second embodiment of refrigerating apparatus; and

Fig. 6 is a front elevation with parts broken away showing the interior in section, of a centrifugal apparatus for the treatment of the ice masses produced in the refrigeration cells.

In carrying out the invention, the milk after having been freed from gas—if desired by evacuation—is cooled in a circular annular vessel 1, the internal diameter and height of which correspond to the dimensions of the basket 24 of the centrifuge 23 (Fig. 6). It has been ascertained that, under these conditions, the ice is deposited in the form of acicular, or lamelliform crystals, which are practically all orientated in the direction of the steepest temperature gradients, namely in the radial direction of the annular vessel 1, the concentrate accumulating, at the same time, in the radially disposed interstices and channels between the ice crystals. The cooling process is continued until the desired amount of ice has been precipitated, or at least to such an extent that the ice skeleton formed in the refrigeration vessel 1 is sufficiently strong to allow the mixture of ice and concentrate to be transferred to the centrifuge 23 without collapsing.

On the termination of the cooling process, the annular block of ice is taken out of the refrigeration vessel 1, if necessary after warming the walls of the latter, and inserted, without loss of shape, in the cage 24 of the centrifuge 23.

Figure 1:
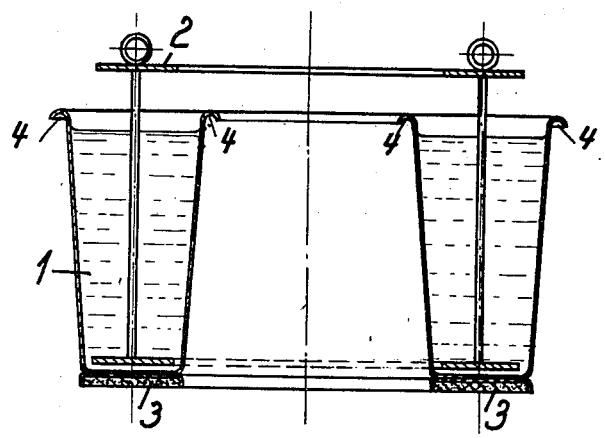
Figs. 1 and 2 are respectively a transverse section and a top plan view of a refrigeration cell.
Figure 2:
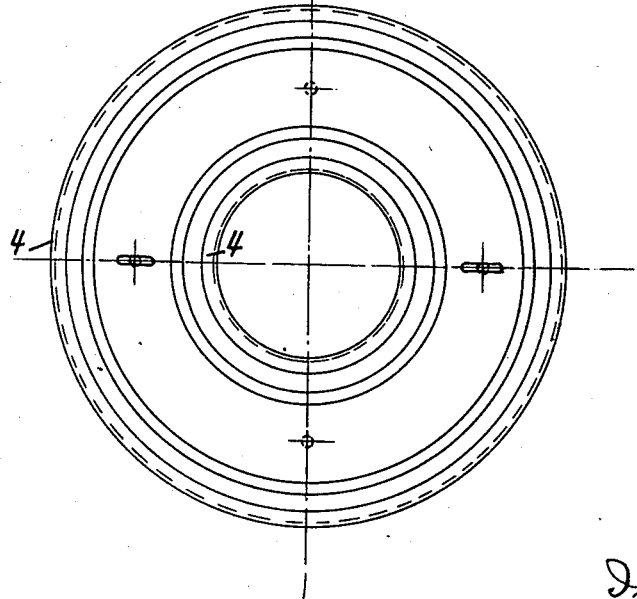

In order to facilitate the withdrawal of the moulded body from the refrigeration vessel 1, the latter is preferably of downwardly tapering design. The upper edges 4 of the vessel are curled over outwards, so that the block of ice can be easily removed, by turning the vessel, without the milk becoming contaminated with the freezing brine. A slightly different method of extracting the frozen block consists in allowing hooks or carriers 2 (Figs. 1, 2 and 6) to freeze into the ice, and employing such devices for withdrawing the moulded body and transferring it to the centrifuge.

In the subsequent centrifuging process, the centrifugal forces generated act in exactly the same direction as that in which the interstices between the crystals which are occupied by the concentrate, are disposed. Consequently, in the herein-described process, the concentrate is readily and extensibly separated from the ice, whereas hitherto, the concentrate (and therefore dry substance) always remained so closely imprisoned between the individual crystals, relatively orientated in different directions, that even the most intensive centrifuging enabled only a relatively incomplete separation to be obtained. In general, the steepest temperature gradient can be so directed that the direction in which the separation of the solid phase from the liquid phase takes place, lies in the same plane as that in which the crystalline lamellæ have grown.

Should wrongly orientated crystals tend to grow at the edges and rims of the annular ice block, from which the concentrate is difficult to expel, the transition of heat, and thus the rate of growth of such crystals, can be reduced, by the provision of heat-insulators 3, (Figs. 1 and 2) at these places, so as to prevent the occurrence of this source of trouble.

By operating in the herein described manner, relatively compact ice is obtained, in thin strata exhibiting narrow intermediate channels. The ice has a temperature, below 0° C., corresponding to a state of equilibrium with the concentrate. When moisture now penetrates into the narrow channels—for example as the result of the interior surface of the ice block becoming partially melted by the warm air agitated by the centrifuge—the water freezes in the channels of the still colder interior of the ice block, thereby choking said channels and rendering impossible further separation of ice and concentrate. On this account, in carrying out the invention, any warming of the inner surfaces of the ice block in the centrifuge is prevented, for example by employing an annular cage—similar to the refrigeration vessel—the inner wall 25 of the cage being solid and thus keeping the ice ring out of contact with air.

A sintering effect, however, may be exerted, for the same reasons, on the ice block by the washing liquid. This difficulty is overcome by using instead of pure water, in the first washing, a solution the concentration of which is adapted to the temperature of the ice for the time being, so that the stripping liquid in the channels cannot freeze. To this end, use is made, for example, of progressively more dilute solutions, sprayed on to the ice through an atomizer nozzle 21. When the ice has reached 0° C., it may be washed with pure water, if desired. This method of stripping the ice can be combined in a simple manner, with the protection against sintering, by allowing a pre-cooled gas, more particularly air, to flow over the inner wall of the ice ring. The temperature of the gas, during the centrifuging of the concentrate, is approximately the same as the melting temperature of the ice for the time being. For the purpose of the stripping operation, its temperature is gradually raised in the desired degree, so that small quantities of ice water are formed, which, at the outset, form with the dry substances adhering to the ice a concentrated solution which becomes progressively more dilute, as the result of the stripping, during the process.

The centrifuged ice block is preferably removed from the centrifuge conjointly with the interchangeable sieve or carrier 2, and is melted by direct or indirect heat exchange with the refrigerating medium.

In order to shorten the freezing period and also to ensure the most complete separation of the concentrate from the ice in centrifuging, the width of the annular refrigeration vessel should not exceed a few centimeters. In order further to increase the transmission of heat between the refrigerating medium, and the milk, the refrigeration vessel is moved in relation to the refrigerating medium—for example by rotation on its axis—on the one hand, and on the other hand a moderate movement towards the refrigerating walls is imparted to the milk. In particular, a movement having a powerful vertical component, is imparted to the refrigerating liquid, so that, in the main, it flows in a vertical direction along the walls of the refrigeration vessel.

The cooling of the annular refrigeration cells will hereinafter be more fully explained, with reference to Figs. 3 to 5.

In Fig. 3, 11 represents the refrigerating tank for the cells, said tank being cooled, for example by the evaporation of a refrigerating liquid, such as ammonia, in the pipes 12. The wall 5 has an opening for the propeller 13 and other openings from which the pipes 15 project upwardly. The annular freezing vessel 1 is positioned so that it surrounds one of the pipes 15 and lies between other of the pipes. In operation the cooling liquid flows down through the propeller 13, over the pipe 12, up through pipes 15 and out of the open ends thereof, down over both the inner and outer walls of the freezing vessel 1, and back along the upper face of the partition wall 5 to the propeller 13. The pipes 15 can be replaced by plates, or the like devices for guiding the liquid.

A somewhat different method of cooling is represented in Fig. 5. In this case, the annular refrigeration cell 1 is not completely immersed in the brine tank, but the brine flows from a high-level cooling tank, through the pipes 16 and 17, to the distributing pipes 18 and 19, by which it is sprayed against the upper edge of the refrigeration cell 1, then runs down the latter, is collected in the vessel 21 and then returned to the brine cooler by the pump 22. The advantage of this method is that the amount of brine to be kept in circulation is substantially less than in the case of the usual cell tanks, and it is therefore possible to adapt the brine temperature to the momentary freezing temperature in the cells, during the stages of the process. Moreover, the expensive cell tanks otherwise required can be replaced by a simple wooden enclosure.

A somewhat different method consists in setting the cells in rotation and providing spiral stages or strips on the interior wall and if desired also on the outer wall of the cells, which devices impart a sufficient vertical movement to the refrigerating liquid during the rotation of the cells.

The advantages of the herein described new process are that the operation is simplified and the apparatus substantially cheapened. In contrast to the processes operating by imparting movement to the material to be cooled, the mechanical stressing of the walls is absent, so that weaker wall material, such as enamel, can be employed in place of rustless steel. Moreover, the effect that may be produced by material scraped off from the walls or stirrers, on the flavour of sensitive substances, such as milk and fruit juices, is prevented. By comparison with the processes in which the solution to be concentrated is frozen to a block, the latter being then crushed and further treated in a centrifuge, the new process offers the advantage that the freezing period is substantially reduced, one working stage is saved, the purity of the product being thereby improved and the loss of cold and substance lessened. Furthermore, as the result of the orientation of the crystals, the separation of the two phases can be carried out with the same expenditure of labour and with an improved yield.

The invention is obviously not restricted to the foregoing example of concentrating milk, but can be similarly applied to the concentration of other liquids, especially such as are sensitive to flavouring influences. It can also be applied to the purification of dissolved substances, such as anhydrous acetic acid, or salts.

It is moreover immaterial for the purposes of the present invention whether the separation of the solid and liquid phases be performed in a centrifuge. The only essential feature is to produce, by refrigeration, a moulded body that can be directly transferred into the separating device, and that the cooling is performed in such a manner that the orientation of the crystals coincides with the direction of the forces effecting the separation of the two phases. Thus, for example when filters are employed for separating the two phases, the moulded body is shaped as a disc corresponding to the filter, said disc being cooled from the end surfaces in such a manner that the crystals and the channels containing the mother liquor are orientated at right angles to said surfaces and therefore in the direction of the suction effort of the filter.

We claim:—

1. A process for the separation of the constituents of liquids which comprises transforming a body of a liquid by cooling into a structurally stable mass of the same shape as said body of liquid, said mass comprising a solid and a liquid phase, and applying force to said mass without disintegration thereof for the separation of said solid and liquid phases.

2. A process for the separation of the constituents of liquids as defined in claim 1 in which the solid and liquid phases of said mass are separated by subjecting the mass to centrifugal force.

3. A process for the separation of the constituents of liquids as defined in claim 1 in which the solid and liquid phases of said mass are separated by forcing a fluid through said mass.

4. A process for the separation of the constituents of liquids as defined in claim 1 in which the mass is annular in shape and in which the liquid phase is separated from the solid phase by subjecting the mass to centrifugal force.

5. A process for the separation of the constituents of liquids as defined in claim 1 in which the mass has two substantially parallel faces and the liquid phase thereof is separated by forcing a fluid through the mass in the direction perpendicular to said faces.

6. Process for the separation of the constituents of liquids as defined in claim 1 in which in cooling the body of liquid a temperature gradient is maintained in a predetermined direction through said body whereby an orientation of the resulting solid phase of the mass in said direction is produced and in which, in the separation of the solid and liquid phases, the force for displacing the liquid phase is applied in said direction.

7. Process for the separation of the constituents of liquids as defined in claim 1 in which an annular body of liquid is converted into an annular structurally stable mass by maintaining a temperature gradient radially of said body and in which the force serving to separate the liquid phase from the solid phase of the mass is applied radially thereof.

8. Process for the separation of the constituents of liquids as defined in claim 1 in which an annular body of liquid is transformed into an annular structurally stable mass and the liquid phase of said mass is separated from the solid phase by centrifugal force acting radially of said mass.

9. Process for the separation of the constituents of liquids as defined in claim 1 in which a body of liquid having at least two substantially parallel faces is transformed into a structurally stable mass by cooling while maintaining a temperature gradient between said faces perpendicular thereto, and in which the liquid phase is separated from the solid phase by force applied perpendicular to said parallel faces.

10. Process for the separation of the constituents of liquids as defined in claim 1 in which a body of liquid having at least two substantially parallel faces is transformed into a structurally stable mass by cooling while maintaining a temperature gradient between said faces perpendicular thereto, and in which the liquid phase is separated from the solid phase by forcing a fluid through the mass in a direction perpendicular to said faces.

11. A process for the separation of the constituents of liquids as defined in claim 1 in which the mass is washed with a liquid which will not solidify at the temperature of the mass.

12. A process for the separation of the constituents of liquids as defined in claim 1 in which a stream of gas at a slightly higher temperature than the mass is contacted therewith.

PAUL SCHUFTAN.
ERNST KARWAT.
ALBRECHT STEINBACH.